(12) United States Patent
Herr et al.

(10) Patent No.: US 11,179,840 B2
(45) Date of Patent: Nov. 23, 2021

(54) HAND-HELD POWER-TOOL DEVICE (71) Applicant: Robert Bosch GmbH, Stuttgart (DE)

(72) Inventors: Tobias Herr, Stuttgart (DE); Jens Blum, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 16/316,861

(22) PCT Filed: Jul. 11, 2017

(86) PCT No.: PCT/EP2017/067404
§ 371 (c)(1),
(2) Date: Jan. 10, 2019

(87) PCT Pub. No.: WO2018/011207
PCT Pub. Date: Jan. 18, 2018

(65) Prior Publication Data
US 2019/0240825 A1 Aug. 8, 2019

(30) Foreign Application Priority Data

Jul. 11, 2016 (DE) .......................... 102016212599.0
Jul. 10, 2017 (DE) .......................... 102017211779.6

(51) Int. Cl.
*F16H 57/08* (2006.01)
*B25F 5/00* (2006.01)
(Continued)

(52) U.S. Cl.
CPC .............. *B25F 5/001* (2013.01); *B23C 3/002* (2013.01); *B25B 21/00* (2013.01); *B25B 21/02* (2013.01); *F16H 57/082* (2013.01); *B25F 5/008* (2013.01)

(58) Field of Classification Search
CPC .... F16H 57/082; F16H 57/0479; B25F 5/001; B23C 3/002
See application file for complete search history.

(56) References Cited

U.S. PATENT DOCUMENTS 3,527,121 A * 9/1970 Moore .................. F16H 57/082
475/338
3,939,736 A * 2/1976 Morin ................... F16H 57/082
475/338
(Continued)

FOREIGN PATENT DOCUMENTS

DE 102010043099 A1 5/2012
EP 2769789 A2 8/2014
(Continued)

OTHER PUBLICATIONS

International Search Report for PCT/EP2017/067404, dated Sep. 27, 2017.

*Primary Examiner* — Stacey A Fluhart
(74) *Attorney, Agent, or Firm* — Norton Rose Fulbright US LLP; Gerard A. Messina (57) ABSTRACT

A hand-held power-tool device is described as including at least one intermediate shaft, which is formed as a planet wheel carrier and includes a plurality of planet wheel receptacles and planet wheel bearing points situated in the circumferential direction. It is provided that the intermediate shaft includes at least one material recess at least in the area of at least one planet wheel bearing point on its outer circumference.

13 Claims, 7 Drawing Sheets

(51) Int. Cl.
  *B25B 21/02* (2006.01)
  *B25B 21/00* (2006.01)
  *B23C 3/00* (2006.01)

(56) References Cited

U.S. PATENT DOCUMENTS

| | | | | |
|---|---|---|---|---|
| 5,470,286 | A * | 11/1995 | Fan | F16H 57/082 475/331 |
| 8,187,141 | B2 * | 5/2012 | Goleski | F16H 57/082 475/331 |
| 2004/0023749 | A1 * | 2/2004 | Zelikov | F16H 57/082 475/331 |
| 2012/0028756 | A1 * | 2/2012 | Lopez | F16H 57/082 475/346 |
| 2012/0196720 | A1 * | 8/2012 | Miyawaki | G03G 15/757 475/345 |
| 2013/0035194 | A1 * | 2/2013 | Ai | B64C 27/12 475/249 |
| 2013/0324352 | A1 * | 12/2013 | Nomura | F16H 57/082 475/331 |
| 2014/0024489 | A1 * | 1/2014 | Heber | B25B 21/00 475/299 |
| 2015/0211605 | A1 * | 7/2015 | Yen | B60J 1/2033 475/331 |
| 2016/0245390 | A1 * | 8/2016 | Mitsch | F03D 80/70 |
| 2018/0003288 | A1 * | 1/2018 | Rippelmeyer | B23B 51/08 |

FOREIGN PATENT DOCUMENTS

| | | |
|---|---|---|
| EP | 2777891 A1 | 9/2014 |
| EP | 2813327 A2 | 12/2014 |

* cited by examiner

HAND-HELD POWER-TOOL DEVICE

BACKGROUND INFORMATION

A hand-held power-tool device including at least one intermediate shaft, which is formed as a planet wheel carrier and includes a plurality of planet wheel receptacles and planet wheel bearing points situated in the circumferential direction, has already been provided.

SUMMARY

The present invention is directed to a hand-held power-tool device including at least one intermediate shaft, which is formed as a planet wheel carrier and includes a plurality of planet wheel receptacles and planet wheel bearing points situated in the circumferential direction.

It is provided that the intermediate shaft includes at least one material recess on its outer circumference at least in the area of at least one planet wheel bearing point.

A "hand-held power-tool device" is to be understood in this context in particular as at least a part, in particular a subassembly, of a hand-held power tool. In particular, the hand-held power-tool device may also encompass the entire hand-held power tool. The hand-held power-tool may be designed as any arbitrary advantageous electrical machine, but advantageously as a rotary impact screwdriver. An "intermediate shaft" is to be understood in particular as a shaft of a drivetrain which is situated in particular between a drive unit and an output shaft, in particular of a hand-held power tool. In particular, the at least one intermediate shaft is provided to transmit a force and/or movement, in particular generated by the drive unit, directly and/or indirectly to the output shaft. In particular, the intermediate shaft is at least partially formed as a planet wheel carrier of the planetary gear of a rotary striking mechanism. "Provided" is to be understood in particular as specially programmed, designed, and/or equipped. An object being provided for a specific function is to be understood in particular to mean that the object fulfills and/or carries out this specific function in at least one application and/or operating state.

A "rotary striking mechanism" is to be understood in this context in particular as a striking mechanism which is provided to convert an at least essentially continuous power delivery of a drive unit into a shock-like angular momentum. The rotary striking mechanism may be designed in particular as a cam rotary striking mechanism or as a V-groove rotary striking mechanism. A "planetary gear" is to be understood in particular as a gearing which includes at least one planet wheel, which is connected to a planet carrier, and is coupled in the radial direction toward the outside to an annulus gear and/or in the radial direction toward the inside to a sun wheel. The sun wheel, the planet wheel, and/or the annulus gear may be formed in particular by round gear wheels or out-of-center gear wheels which are coordinated. Multiple planetary gears may be connected in succession and/or multiple stages may be interconnected between planet wheel and annulus gear. An "annulus gear" is to be understood in particular as a gear wheel, which includes a collar designed in the form of a cylinder jacket or in the form of a broken cylinder jacket.

A "planet wheel receptacle" is to be understood in this context in particular as a receptacle of the intermediate shaft which is provided for a partial arrangement in particular of a planet wheel. A "planet wheel bearing point" is to be understood in particular as a point within a planet wheel receptacle at which the planet wheel is rotatably mounted within the planet wheel receptacle in an installed state. In particular, the intermediate shaft includes three planet wheel receptacles each having one planet wheel bearing point. The planet wheel bearing points are in particular situated offset by at least essentially 120° in relation to one another in each case in the circumferential direction on the intermediate shaft. In particular, the planet wheel receptacles are separated from one another by webs extending radially in relation to a longitudinal extension direction of the intermediate shaft. Viewed along the longitudinal extension direction of the intermediate shaft, the planet wheel receptacles are delimited by two disk-shaped wall elements, which are situated at least essentially perpendicularly with respect to the longitudinal extension direction. The term "essentially perpendicularly" is to define here in particular an alignment of a direction in relation to a reference direction, the direction and the reference direction, in particular observed in a plane, enclosing an angle of 90° and the angle having a maximum deviation of in particular less than 8°, advantageously less than 5°, and particularly advantageously less than 2°. The wall elements are formed at least essentially to be circular. In particular, the wall elements are formed in one piece with the intermediate shaft. "In one piece" is to be understood in particular as at least integrally joined, for example, by a welding process, an adhesive bonding process, an extrusion process, and/or another process appearing reasonable to those skilled in the art, and/or advantageously molded in one piece, for example, by manufacturing from a casting and/or by manufacturing in a single-component or multicomponent injection molding method and advantageously from a single blank. The wall elements are in particular situated at least essentially concentrically with respect to a rotation axis of the intermediate shaft.

The material recess is introduced in particular into one of the wall elements. In particular, the material recess is introduced into a wall element which is situated in the direction of a drive unit in an installed state of the intermediate shaft in a hand-held power tool. In particular, the planet wheel bearing point is situated along a radial direction between a rotation axis of the intermediate shaft and the material recess. The intermediate shaft preferably has a material recess in each case in areas of each of the planet bearing points. A number of material recesses preferably corresponds to a number of planet wheel receptacles. Precisely one material recess is preferably associated with each planet wheel receptacle.

A generic hand-held power-tool device may be provided with advantageous structural properties by such a design. In particular, an advantageous weight optimization of the intermediate shaft may be achieved by the material recess. Furthermore, the material recess may advantageously be used as a lubrication pocket, whereby simple re-lubrication of planet wheels may advantageously be achieved.

Furthermore, it is provided that the material recess is at least essentially in the form of a circular segment. "In the form of a circular segment" is to be understood in this context in particular as a geometrical shape which is formed at least essentially by a partial area of a circular surface, which is delimited by a circular arc and a chord. "At least essentially in the form of a circular segment" is to be understood in this context in particular to mean that the contour of the material recess is formed at least 80%, preferably at least 90%, and particularly preferably at least 95% in the form of a circular segment. In this way, the material recess may have an advantageous geometry, in particular with respect to advantageously simple manufacturing.

Furthermore, it is provided that the planet wheel receptacles are at least essentially in the form of cylinder segments. "At least essentially in the form of cylinder segments" is to be understood in this context in particular to mean that the contour of the material recess is formed at least 80%, preferably at least 90%, and particularly preferably at least 95% in the form of a cylinder segment. The planet wheel receptacle may have an advantageous geometry in this way, in particular with respect to advantageously simple manufacturing and/or an accommodation of planet wheels.

Furthermore, it is provided that the material recess is provided for at least temporary and at least partial accommodation of a milling head spindle during manufacturing of the intermediate shaft. The material recess being provided for "temporary accommodation of a milling head spindle" is to be understood in this context in particular to mean that a milling head spindle protrudes at least temporarily into the material recess, in particular at least during an introduction of the planet receptacle, in particular with the aid of a side milling cutter. A "side milling cutter" is to be understood in this context in particular as a milling tool which includes at least one milling head in the form of a circular disk and a drive spindle, which is situated at least perpendicularly with respect to the milling head. In particular the milling head spindle extends at least essentially parallel to a rotation axis of the intermediate shaft during an introduction of the planet receptacle. Advantageously simple introduction of the planet wheel receptacle may be enabled in this way.

Moreover, a method is provided for manufacturing a hand-held power-tool device according to the present invention, in which the planet wheel receptacles are introduced into the intermediate shaft with the aid of a side milling cutter. In particular, the side milling cutter is guided to the intermediate shaft in such a way that the milling head spindle of the side milling cutter extends at least essentially parallel to a main extension direction of the intermediate shaft at every point in time. A "main extension direction" of an object is to be understood in this case in particular as a direction which extends parallel to a longest edge of a smallest geometrical cuboid, which the object still just completely encloses. A spindle of the side milling cutter is preferably introduced at least partially into a material recess during an introduction of the planet wheel receptacles. The planet wheel receptacles are preferably introduced in a shared method step at least essentially simultaneously into the intermediate shaft. In this way, an advantageously simple and/or rapid introduction of planet wheel receptacles may take place.

Furthermore, a hand-held power tool, in particular a rotary impact screwdriver, including at least one hand-held power-tool device according to the present invention is provided. A hand-held power tool, in particular a rotary impact screwdriver, having advantageous structural properties may be provided in this way.

The hand-held power-tool device according to the present invention is not to be restricted in this case to the above-described application and specific embodiment. In particular, the hand-held power-tool device according to the present invention may include a number of individual elements, components, and units, which deviates from a number mentioned herein to fulfill a functionality described herein.

BRIEF DESCRIPTION OF THE DRAWINGS

Further advantages result from the following description of the drawings. Three exemplary embodiments of the present invention are shown in the drawings. The drawings and the description contain numerous features in combination. Those skilled in the art will advantageously also consider the features individually and combine them into reasonable further combinations.

DETAILED DESCRIPTION

Figure 1:
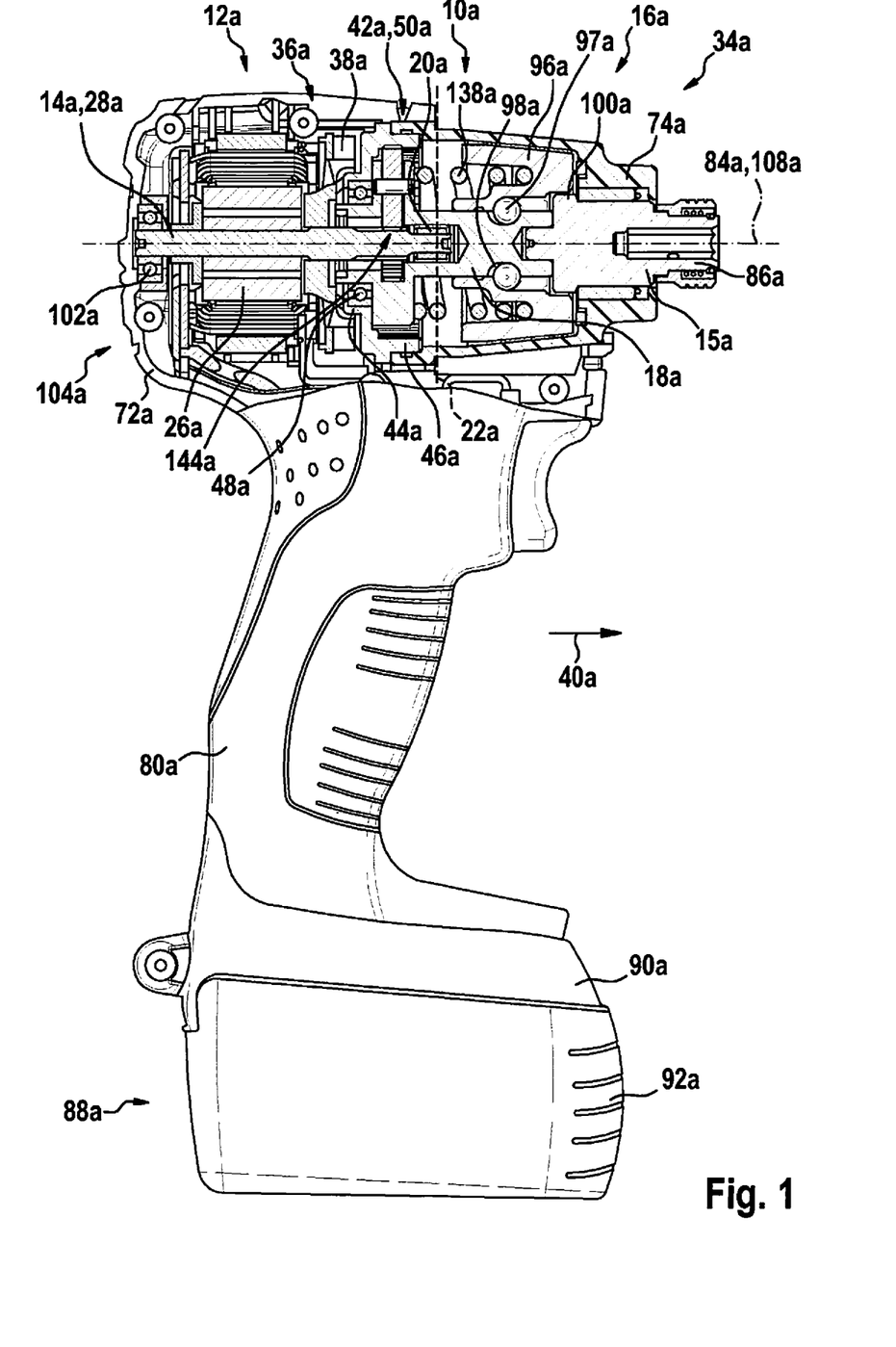
FIG. 1 shows a schematic partial sectional view of a hand-held power tool which is designed as a rotary impact screwdriver.

FIG. 1 shows a hand-held power tool 34a, which is designed as a rotary impact screwdriver, in a schematic partial sectional view. Hand-held power tool 34a is designed as a battery-powered rotary impact screwdriver. Hand-held power tool 34a includes a handle 80a, which extends perpendicularly to a rotation axis 84a of a tool receptacle 86a of hand-held power tool 34a provided for accommodating an insert tool (not shown here). Handle 80a includes a rechargeable battery holder 90a on a side 88a facing away from hand-held power tool 34a. Rechargeable battery holder 90a is provided for accommodating a rechargeable battery unit 92a for the power supply of hand-held power tool 34a.

Figure 2:
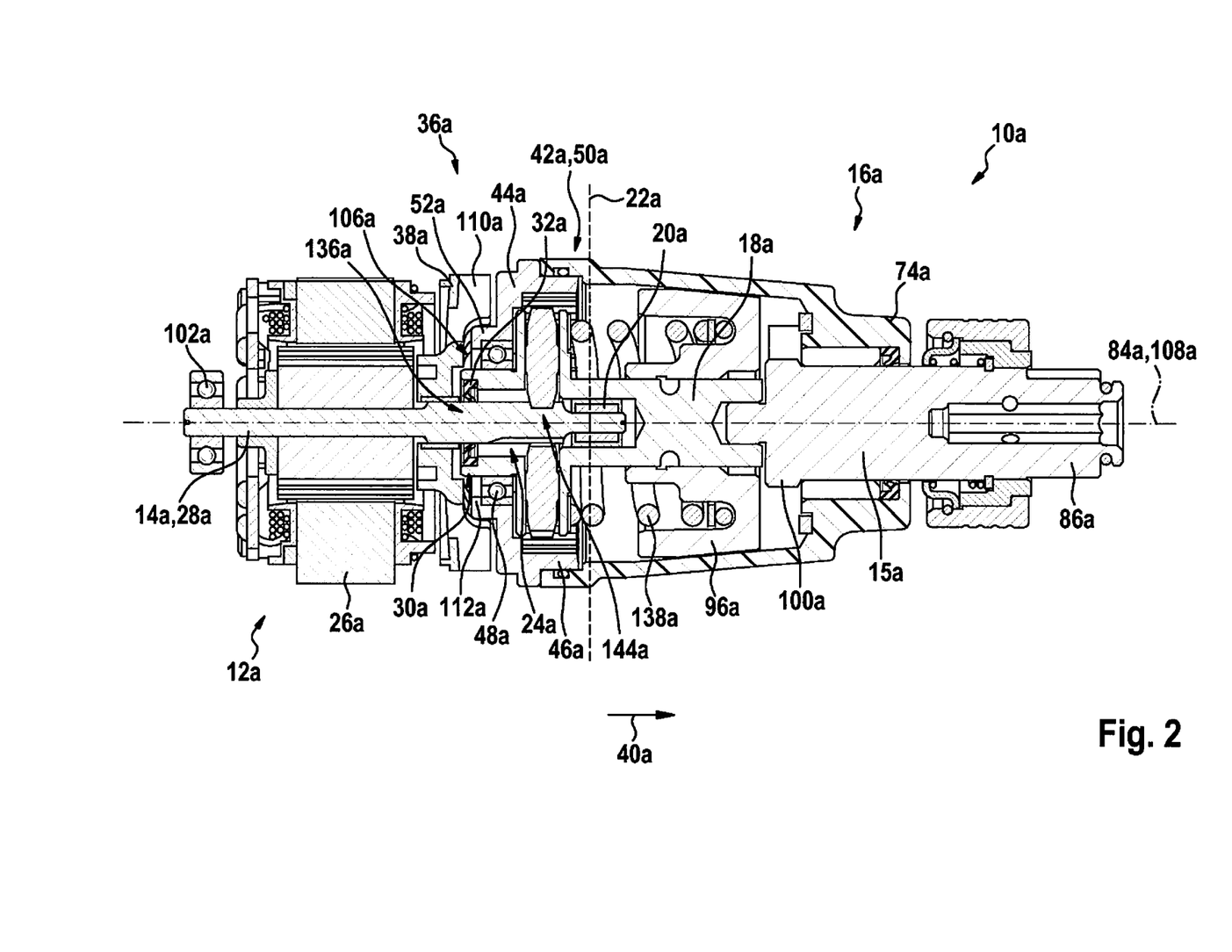
FIG. 2 shows a sectional view of a hand-held power-tool device of the hand-held power tool including a drive unit and a rotary striking mechanism.

Furthermore, hand-held power tool 34a includes a hand-held power-tool device 10a including a drive unit 12a and a rotary striking mechanism 16a. FIG. 2 shows hand-held power-tool device 10a in a sectional view. Hand-held power-tool device 10a includes a drive housing 72a and a striking mechanism housing 74a (cf. FIG. 1). Drive housing 72a encloses drive unit 12a at least essentially completely. Striking mechanism housing 74a encloses rotary striking mechanism 16a at least essentially completely (cf. FIG. 1). Drive unit 12a is designed as an electrical drive unit, which is supplied with electrical energy with the aid of rechargeable battery unit 92a. Drive unit 12a includes a housing-free electric motor 26a, which is provided for converting the electrical energy provided by rechargeable battery unit 92a into rotational energy. Electric motor 26a is designed as an open-frame motor, in which components of electric motor 26a are mounted individually in drive housing 72a. Furthermore, drive unit 12a includes a driveshaft 14a, which is provided for transmitting the rotational energy to rotary striking mechanism 16a. Driveshaft 14a is completely formed by an armature shaft 28a of housing-free electric motor 26a. Armature shaft 28a is formed in one piece. Rotary striking mechanism 16a is designed as a V-groove rotary striking mechanism. Rotary striking mechanism 16a is provided for converting a continuous power delivery of drive unit 12a into a shock-like angular momentum. The power of drive unit 12a is relayed to the insert tool by an impact of a striker 96a of rotary striking mechanism 16a on a corresponding anvil 100a of an output spindle 15a with the aid of a pulse of high power intensity. Anvil 100a is formed in one piece with output spindle 15a and tool receptacle 86a in the illustrated specific embodiment. Striker 96a is mounted in such a way that an axial movement and a radial movement are possible. The axial movement is controlled by V-shaped grooves 98a (cf FIG. 3) and driving balls 97a (cf FIG. 1). A spring 138a ensures the restoring movement of striker 96a.

Rotary striking mechanism 16a includes an intermediate shaft 18a, which is oriented at least essentially flush with respect to driveshaft 14a. Furthermore, hand-held power-tool device 10a includes at least one bearing 20a for mounting driveshaft 14a. Bearing 20a is situated at least partially in a plane 22a, which intersects intermediate shaft 18a and proceeds at least essentially perpendicular with respect to intermediate shaft 18a. Driveshaft 14a is at least partially mounted inside intermediate shaft 18a. Intermediate shaft 18a includes a receptacle recess 24a, which is provided for at least partially accommodating driveshaft 14a. Receptacle recess 24a extends at least essentially along a rotation axis 108a of intermediate shaft 18a. Driveshaft 14a protrudes at least partially into intermediate shaft 18a, in particular into receptacle recess 24a of intermediate shaft 18a, in an installed state. Bearing 20a for mounting driveshaft 14a is situated inside receptacle recess 24a. Bearing 20a for mounting driveshaft 14a is designed as an antifriction bearing. Intermediate shaft 18a furthermore includes a sealing element receptacle 30a. Sealing element receptacle 30a is situated directly at an insertion opening 136a of receptacle recess 24a of intermediate shaft 18a, which is provided for inserting driveshaft 14a into intermediate shaft 18a. Moreover, intermediate shaft 18a includes at least one sealing element 32a situated in sealing element receptacle 30a. Sealing element 32a is designed as a shaft sealing ring, in particular as a radial shaft sealing ring, which is situated in the installed state between driveshaft 14a and intermediate shaft 18a. Sealing element receptacle 30a is designed as a shaft sealing ring receptacle. A further bearing 102a for mounting driveshaft 14a is situated in drive housing 72a on a side 104a of electric motor 26a facing away from tool receptacle 86a.

Moreover, hand-held power-tool device 10a includes a cooling air unit 36a, which includes at least one fan wheel 38a situated between drive unit 12a and rotary striking mechanism 16a. Fan wheel 38a is provided in particular for generating a cooling airflow for cooling rotary striking mechanism 16a and/or drive unit 12a. Fan wheel 38a is rotatably fixedly situated on driveshaft 14a of drive unit 12a. Drive unit 12a is provided for setting fan wheel 38a into a rotational movement during operation of hand-held power tool 34a. Fan wheel 38a and rotary striking mechanism 16a overlap at least partially in axial direction 40a. Preferably, fan wheel 38a at least partially projects beyond rotary striking mechanism 16a in axial direction 40a. Fan wheel 38a has a plurality of fan wheel blades 110a situated in the circumferential direction, which overlap at least a part of rotary striking mechanism 16a in the circumferential direction. Fan wheel blades 110a extend at least essentially in axial direction 40a. Rotary striking mechanism 16a includes at least one gearing unit 42a designed as a single-stage planetary gear 50a. Bearing 20a for mounting driveshaft 14a is situated on a side of planetary gear 50a facing away from drive unit 12a. A toothing 144a between driveshaft 14a and planetary gear 50a is situated between bearing 20a and bearing 102a. Alternatively, gearing unit 42a may be designed as a multistage planetary gear. Fan wheel 38a and at least gearing unit 42a preferably at least partially overlap in axial direction 40a. Planetary gear 50a includes at least one annulus gear 46a. Furthermore, rotary striking mechanism 16a includes a striking mechanism cover 44a. Striking mechanism cover 44a is situated between drive unit 12a and planetary gear 50a. In particular, striking mechanism cover 44a is provided for closing at least a large part of rotary striking mechanism 16a in the direction of drive unit 12a. Striking mechanism cover 44a includes a through-recess 106a, which is provided for at least driveshaft 14a to at least partially pass through. Striking mechanism cover 44a is formed in one piece with annulus gear 46a. Striking mechanism cover 44a and annulus gear 46a at least essentially are made of a metallic material, in particular of a metallic sintering material. Fan wheel 38a and at least striking mechanism cover 44a preferably at least partially overlap in axial direction 40a.

Hand-held power-tool device 10a furthermore includes an intermediate shaft bearing 48a for mounting intermediate shaft 18a. Intermediate shaft bearing 48a is designed as an antifriction bearing. Alternatively, intermediate shaft bearing 48a may be designed as a slide bearing. Intermediate shaft bearing 48a is designed as a radial bearing, which is provided for rotatably mounting intermediate shaft 18a in striking mechanism cover 44a. Intermediate shaft bearing 48a is situated at least partially inside a striking mechanism cover 44a of rotary striking mechanism 16a. Intermediate shaft bearing 48a is situated directly at pass-through recess 106a of striking mechanism cover 44a. Intermediate shaft bearing 48a is situated on the side of striking mechanism cover 44a facing toward tool receptacle 86a. Striking mechanism cover 44a includes at least one bearing receptacle 52a, which is provided for accommodating intermediate shaft bearing 48a. Bearing receptacle 52a is formed in one piece with striking mechanism cover 44a. Bearing receptacle 52a is situated in the area of through-recess 106a of striking mechanism cover 44a. Bearing receptacle 52a is at least essentially hollow-cylindrical. Bearing receptacle 52a has an at least essentially ring-shaped stop element 112a for intermediate shaft bearing 48a on an end facing away from striking mechanism cover 44a. Stop element 112a is formed in one piece with bearing receptacle 52a. An internal diameter of bearing receptacle 52a at least essentially corresponds to an external diameter of intermediate shaft bearing 48a. Intermediate shaft bearing 48a is preferably fixed by a press fit in bearing receptacle 52a. Fan wheel 38a and at least intermediate shaft bearing 48a and/or intermediate shaft 18a preferably at least partially overlap in axial direction 40a.

Figure 3:
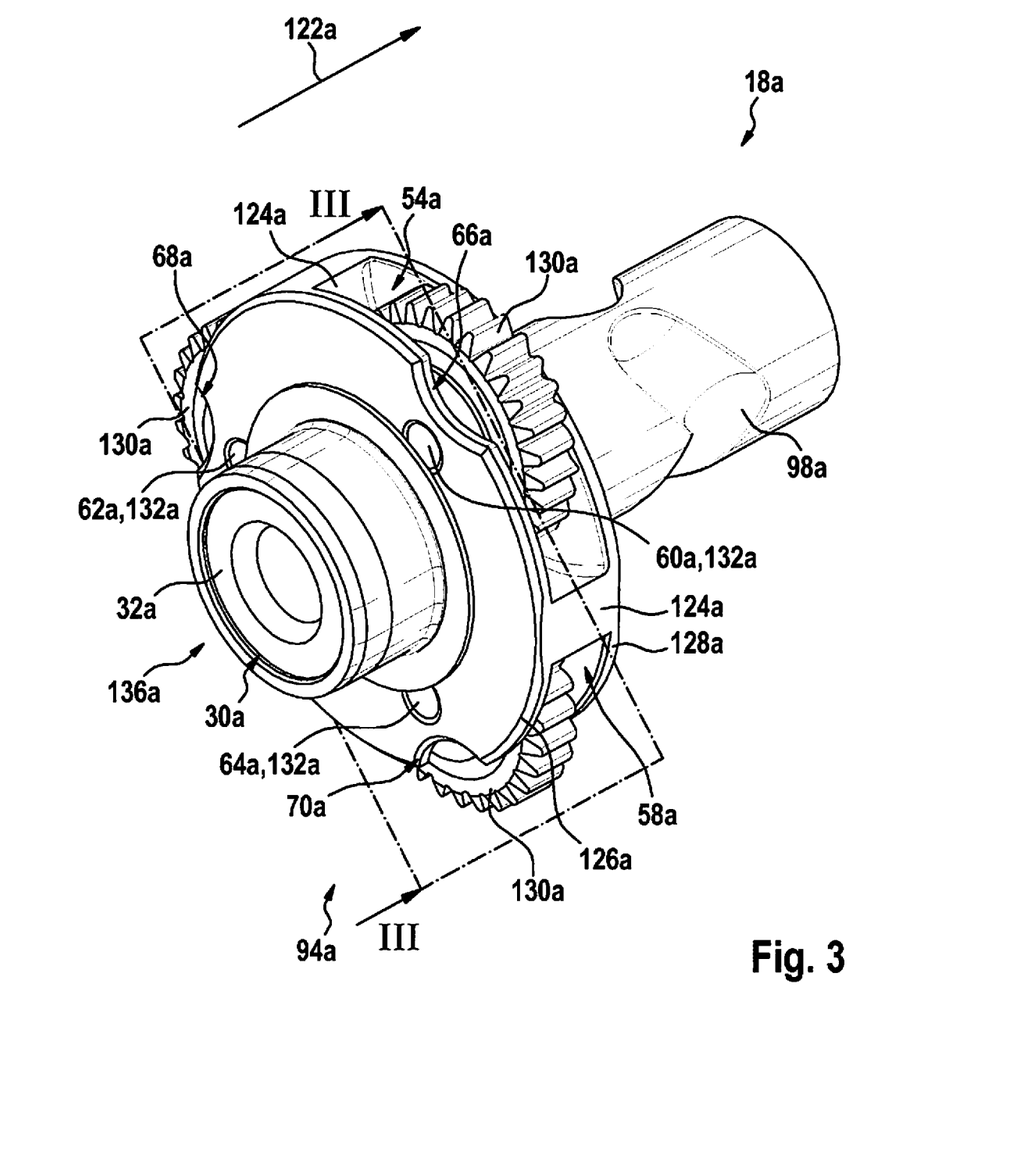
FIG. 3 shows an intermediate shaft of the hand-held power-tool device from FIG. 2 in a perspective view.
Figure 4:
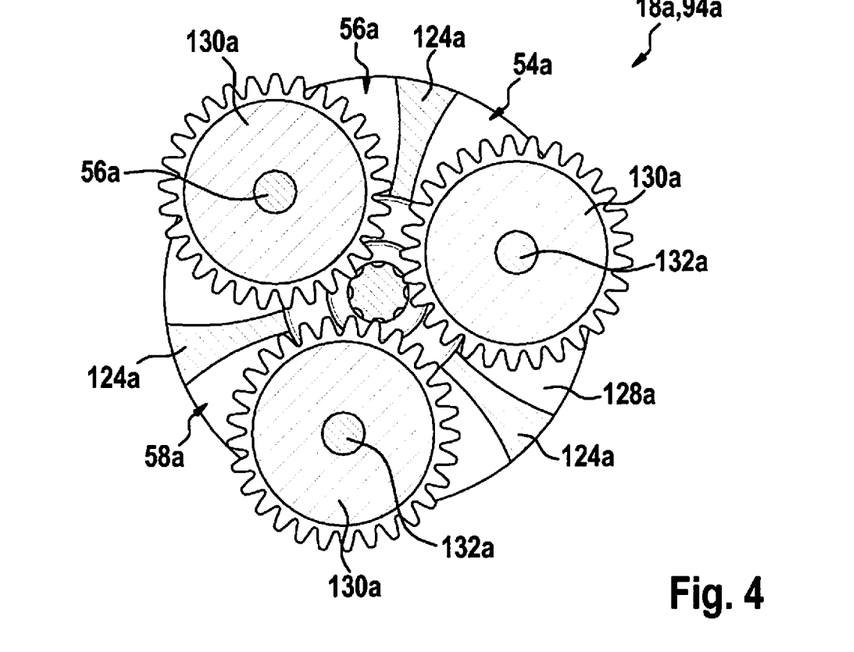
FIG. 4 shows a sectional view of the intermediate shaft from FIG. 3.

FIG. 3 shows intermediate shaft 18a in a perspective view. FIG. 4 shows intermediate shaft 18a in a sectional view along sectional plane III-III. Intermediate shaft 18a is designed as a planet wheel carrier 94a of planetary gear 50a. Intermediate shaft 18a includes a plurality of planet wheel receptacles 54a, 56a, 58a and planet wheel bearing points 60a, 62a, 64a situated in the circumferential direction. One planet wheel 130a, which is rotatably mounted with the aid of a pin 132a, is situated in each planet wheel receptacle 54a, 56a, 58a. Intermediate shaft 18a includes at least one material recess 66a, 68a, 70a on its outer circumference at least in the area of at least one planet wheel bearing point 60a, 62a, 64a. A number of material recesses 66a, 68a, 70a corresponds to a number of planet wheel receptacles 54a, 56a, 58a. Precisely one material recess 66a, 68a, 70a is associated with each planet wheel receptacle 54a, 56a, 58a. Intermediate shaft 18a includes three planet wheel receptacles 54a, 56a, 58a, each having one planet wheel bearing point 60a, 62a, 64a. Planet wheel bearing points 60a, 62a, 64a are situated offset by at least essentially 120° in relation to one another in each case in the circumferential direction on intermediate shaft 18a. Planet wheel receptacles 54a, 56a, 58a are separated from one another by webs 124a extending radially in relation to a longitudinal extension direction 122a of intermediate shaft 18a. Viewed along longitudinal extension direction 122a of intermediate shaft 18a, planet wheel receptacles 54a, 56a, 58a are delimited by two disk-shaped wall elements 126a, 128a, which are situated at least essentially perpendicularly to longitudinal extension direction 122a. Wall elements 126a, 128a are at least essentially circular. Wall elements 126a, 128a are formed in one piece with intermediate shaft 18a. Material recesses 66a, 68a, 70a are at least essentially in the form of circular segments. Planet wheel receptacles 54a, 56a, 58a are at least essentially in the form of cylinder segments. Material recesses 66a, 68a, 70a are introduced into one of the wall elements 126a, 128a. Material recesses 66a, 68a, 70a are introduced into wall element 126a, which is situated in an installed state of intermediate shaft 18a in the direction of a drive unit 12a. Wall elements 126a, 128a have an at least essentially identical radius. Alternatively, one of wall elements 126a, 128a may have a shorter radius.

Figure 5:
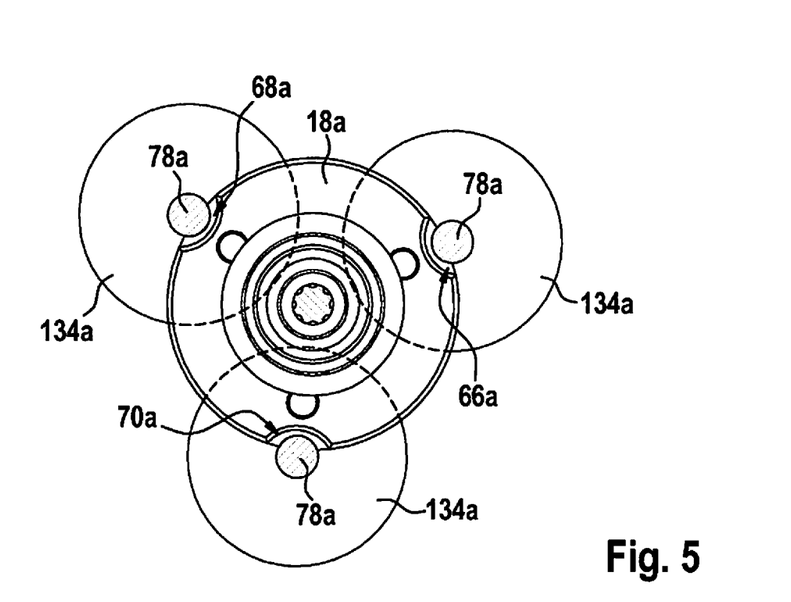
FIG. 5 shows a schematic view of an introduction of planet wheel receptacles into the intermediate shaft.

Material recesses 66a, 68a, 70a are provided during manufacturing of intermediate shaft 18a for at least temporary and at least partial accommodation of a milling head spindle 78a (cf. FIG. 5). Planet wheel receptacles 54a, 56a, 58a are introduced with the aid of a side milling cutter 134a into a blank of intermediate shaft 18a. During the introduction of planet wheel receptacles 54a, 56a, 58a, a milling head spindle 78a of side milling cutter 134a is at least partially inserted into a material recess 66a, 68a, 70a. Planet wheel receptacles 54a, 56a, 58a are introduced in a shared method step at least essentially simultaneously into intermediate shaft 18a, in particular with the aid of a plurality of identical side milling cutters 134a. Side milling cutters 134a are guided toward intermediate shaft 18a in such a way that milling head spindles 78a extend at least essentially parallel to a longitudinal extension direction 122a of intermediate shaft 18a at every point in time.

Figure 6:
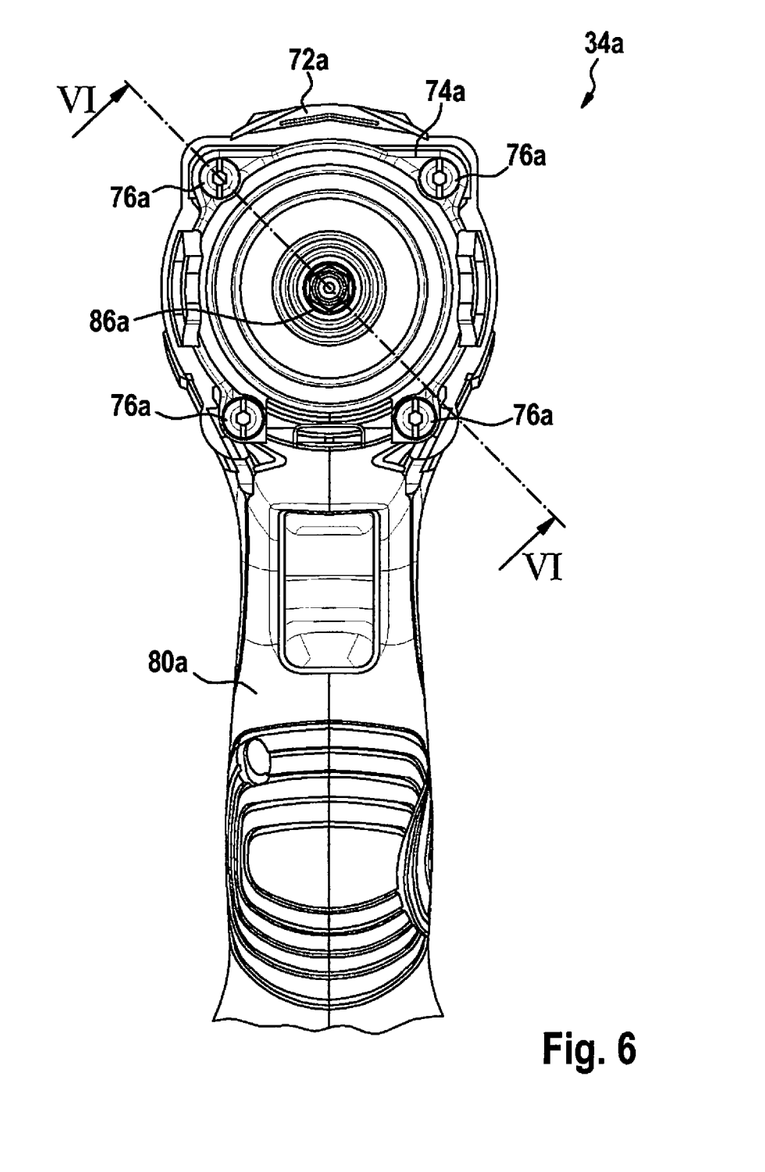
FIG. 6 shows the hand-held power tool in a frontal view.
Figure 7:
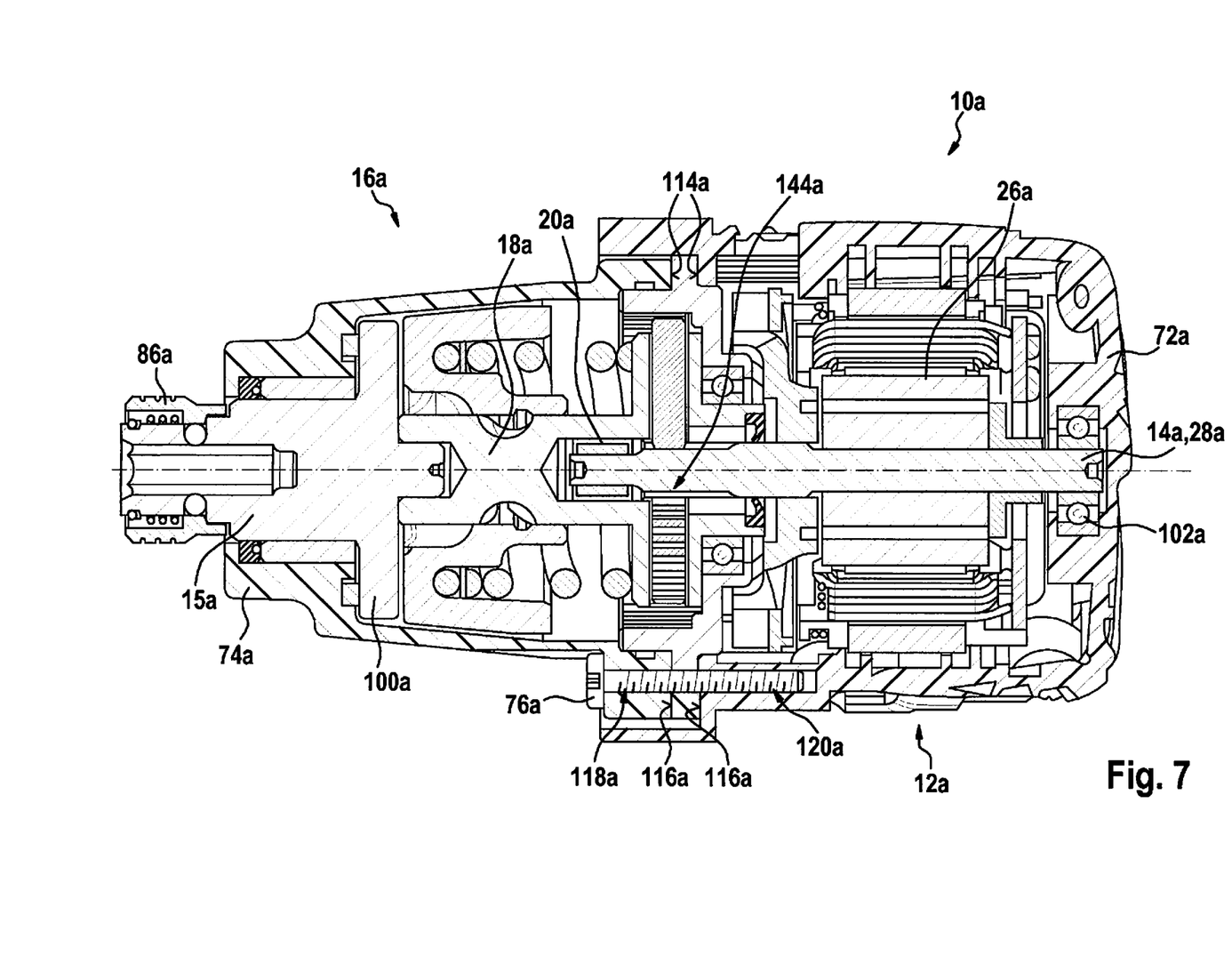
FIG. 7 shows a sectional view of the hand-held power tool.

FIG. 6 shows hand-held power tool 34a in a frontal view. FIG. 7 shows a sectional view of hand-held power tool 34a along sectional line VI-VI. Annulus gear 46a of planetary gear 50a is clamped between drive housing 72a and striking mechanism housing 74a. Drive housing 72a and striking mechanism housing 74a include a clamping surface 114a, each of which rest in an installed state from opposing sides on at least one surface 116a of annulus gear 46a and which each exert a clamping force on annulus gear 46a. Annulus gear 46a is fixed with the aid of at least one screw element 76a, preferably with the aid of at least one screw, on drive housing 72a. Annulus gear 46a is fixed using four screw elements 76a, for example. Annulus gear 46a includes recesses 118a on an outer circumference which are provided for passing through screw elements 76a. Drive housing 72a includes a number of threaded recesses 120a, which include a thread corresponding to a thread of screw elements 76a, corresponding to the number of screw elements 76a. Drive housing 72a, striking mechanism housing 74a, and annulus gear 46a are connected to one another in an installed state with the aid of screw elements 76a, annulus gear 46a being situated between drive housing 72a and striking mechanism housing 74a. Alternatively or additionally, annulus gear 46a may be fixed with the aid of at least one screw element 76a on striking mechanism housing 74a.

Figure 8:
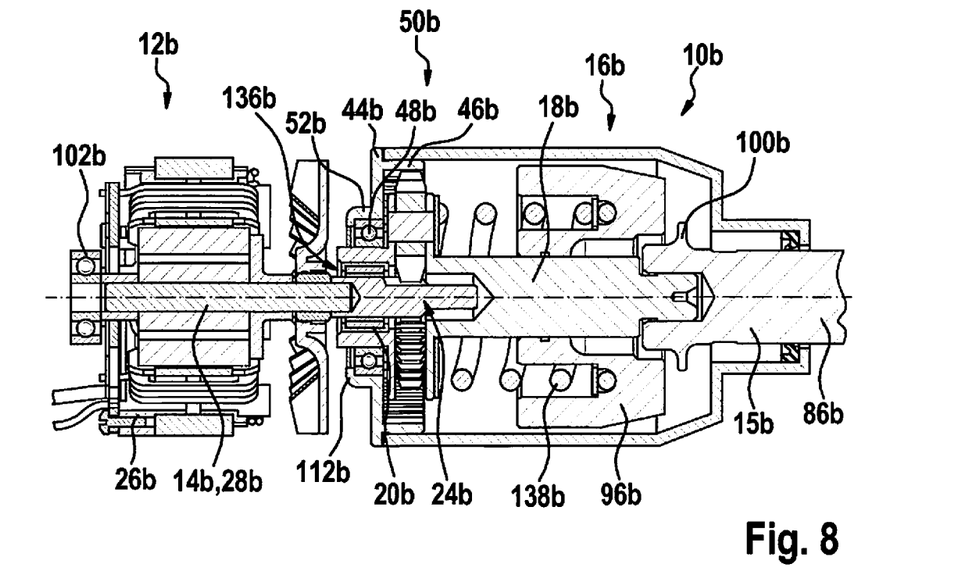
FIG. 8 shows a sectional view of an alternative hand-held power-tool device.
Figure 9:
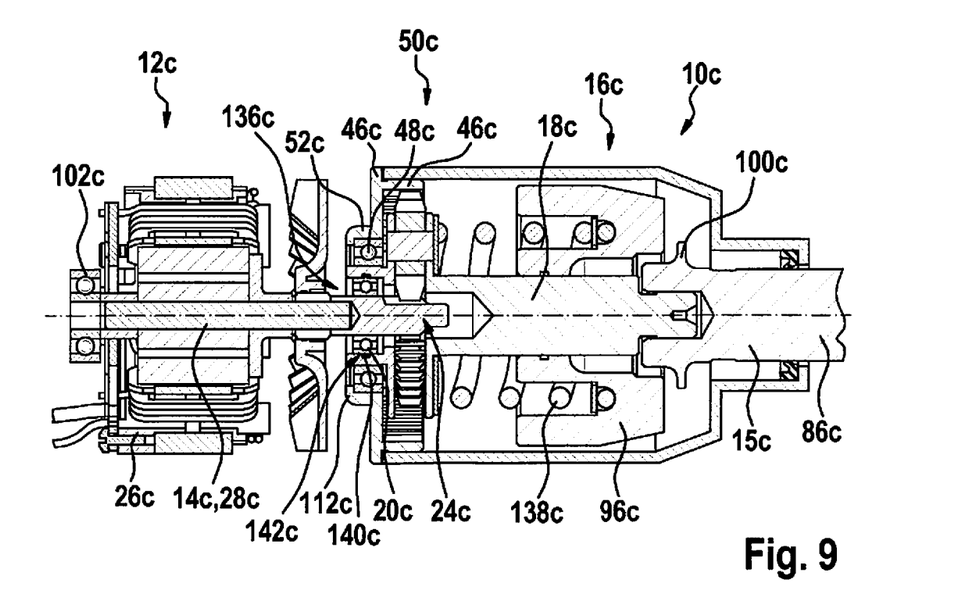
FIG. 9 shows a sectional view of another alternative hand-held power-tool device.

Another exemplary embodiment of the present invention is shown in FIGS. 8 and 9. The following descriptions and the drawings are essentially restricted to the differences between the exemplary embodiments, reference also basically being able to be made to the drawings and/or the description of the other exemplary embodiments, in particular of FIGS. 1 through 7, with respect to identically labeled components, in particular with respect to components having identical reference numerals. To differentiate the exemplary embodiments, the letter a is appended to the reference numerals of the exemplary embodiment in FIGS. 1 through 7. Letter a is replaced by letters b to c in the exemplary embodiments of FIGS. 8 and 9.

FIG. 8 shows an alternative embodiment of hand-held power-tool device 10b in a sectional view. Hand-held power-tool device 10b includes a drive unit 12b and a rotary striking mechanism 16b including a planetary gear 50b. Drive unit 12b includes a housing-free electric motor 26b, which is provided for converting electrical energy into rotational energy. Electric motor 26b is designed as an open-frame motor. Furthermore, drive unit 12b includes a driveshaft 14b, which is provided for transmitting the rotational energy to rotary striking mechanism 16b. Driveshaft 14b is partially formed by an armature shaft 28b of housing-free electric motor 26b.

Rotary striking mechanism 16b includes an intermediate shaft 18b, which is oriented at least essentially flush with respect to driveshaft 14b. Furthermore, hand-held power-tool device 10b includes at least one bearing 20b for mounting driveshaft 14b. Driveshaft 14b is at least partially mounted inside intermediate shaft 18b. Intermediate shaft 18b includes a receptacle recess 24b, which is provided to at least partially accommodate driveshaft 14b. Bearing 20b is situated directly at an insertion opening 136b of receptacle recess 24b of intermediate shaft 18b, which is provided for inserting driveshaft 14b into intermediate shaft 18b. Bearing 20b for mounting driveshaft 14b is situated on a side of planetary gear 50b facing toward drive unit 12b. Bearing 20b is designed as a roller bearing.

FIG. 9 shows another alternative embodiment of hand-held power-tool device 10c in a sectional view. Hand-held power-tool device 10c includes a drive unit 12c and a rotary striking mechanism 16c including a planetary gear 50c. Drive unit 12c includes a housing-free electric motor 26c, which is provided for converting electrical energy into rotational energy. Electric motor 26c is designed as an open-frame motor. Furthermore, drive unit 12c includes a driveshaft 14c, which is provided for transmitting the rotational energy to rotary striking mechanism 16c. Driveshaft 14c is partially formed by an armature shaft 28c of housing-free electric motor 26c.

Rotary striking mechanism 16c includes an intermediate shaft 18c, which is oriented at least essentially flush with respect to driveshaft 14c. Furthermore, hand-held power-tool device 10c includes at least one bearing 20c for mounting driveshaft 14c. Driveshaft 14c is at least partially mounted inside intermediate shaft 18c. Intermediate shaft 18c includes a receptacle recess 24c, which is provided for at least partially accommodating driveshaft 14c. Bearing 20c is situated directly at an insertion opening 136c of receptacle recess 24c of intermediate shaft 18c, which is provided for inserting driveshaft 14c into intermediate shaft 18c. Bearing 20c for mounting driveshaft 14c is situated on a side of planetary gear 50c facing toward drive unit 12c. Bearing 20c is designed as a ball bearing. Furthermore, hand-held power-tool device 10c includes a sealing ring 140c, which encloses bearing 20c in the circumferential direction and which is situated between bearing 20c and an internal diameter receptacle recess 24c of intermediate shaft 18c. Intermediate shaft 18c includes a groove 142c, which is provided for accommodating sealing ring 140c.

What is claimed is:

1. A hand-held power-tool device, comprising:
at least one intermediate shaft formed as a planet wheel carrier, the intermediate shaft including a plurality of planet wheel receptacles and planet wheel bearing points situated in a circumferential direction, wherein the intermediate shaft includes at least one material recess associated with at least one of the planet wheel bearing points on an outer circumference of the intermediate shaft,
wherein the planet wheel bearing points are aligned along a radial direction between a rotation axis of the intermediate shaft and the material recess,
wherein each planet wheel receptacle has a respective one planet wheel bearing point of the planet wheel bearing points, and wherein each planet wheel bearing point is situated offset in relation to one another by at least 120° in the circumferential direction,
wherein an entirety of the at least one material recess has a concave shaped contour.

2. The hand-held power-tool device as recited in claim 1, wherein the material recess is at least in the form of a circular segment.

3. The hand-held power-tool device as recited in claim 1, wherein the at least one material recesses include a number of material recesses corresponding to a number of the planet wheel receptacles.

4. The hand-held power-tool device as recited in claim 3, wherein each planet wheel receptacle is associated with precisely one material recess.

5. The hand-held power-tool device as recited in claim 1, wherein the planet wheel receptacles are at least in the form of cylinder segments.

6. The hand-held power-tool device as recited in claim 1, wherein the at least one material recess at least temporarily and at least partially accommodates the milling head spindle during manufacturing of the intermediate shaft.

7. The hand-held power-tool device as recited in claim 1, wherein the planet wheel receptacles are delimited by two disk-shaped wall elements which are situated at least essentially perpendicularly with respect to a longitudinal extension direction of the at least one intermediate shaft.

8. The hand-held power-tool device as recited in claim 7, wherein the wall elements are at least essentially circular.

9. The hand-held power-tool device as recited in claim 7, wherein the wall elements are formed in one piece with the at least one intermediate shaft.

10. The hand-held power-tool device as recited in claim 7, wherein the at least one material recess is introduced into one of the two wall elements which is situated in a direction of a drive unit in an installed state of the at least one intermediate shaft in a hand-held power-tool.

11. A method for manufacturing a hand-held power-tool device that includes at least one intermediate shaft formed as a planet wheel carrier, the intermediate shaft including a plurality of planet wheel receptacles and planet wheel bearing points situated in a circumferential direction, wherein the intermediate shaft includes at least one material recess associated with at least one of the planet wheel bearing points on an outer circumference of the intermediate shaft, the method comprising:
introducing the planet wheel receptacles with the aid of a side milling cutter into the intermediate shaft,
during the introducing of the planet wheel receptacles, inserting a spindle of the side milling cutter at least partially into the at least one material recess.

12. The method as recited in claim 11, wherein the planet wheel receptacles are introduced at least essentially simultaneously into the intermediate shaft in a shared method step.

13. A hand-held power tool, comprising:
at least one hand-held power-tool device that includes at least one intermediate shaft formed as a planet wheel carrier, the intermediate shaft including a plurality of planet wheel receptacles and planet wheel bearing points situated in a circumferential direction, wherein the intermediate shaft includes at least one material recess associated with at least one of the planet wheel bearing points on an outer circumference of the intermediate shaft, wherein the planet wheel bearing points are aligned along a radial direction between a rotation axis of the intermediate shaft and the material recess, wherein each planet wheel receptacle has a respective one planet wheel bearing point of the planet wheel bearing points, and wherein each planet wheel bearing point is situated offset in relation to one another by at least 120° in the circumferential direction,
wherein an entirety of the at least one material recess has a concave shaped contour.

* * * * *